US010827181B1

(12) United States Patent
Sen et al.

(10) Patent No.: US 10,827,181 B1
(45) Date of Patent: Nov. 3, 2020

(54) DIFFERENTIAL ADAPTIVE BITRATE STREAMING BASED ON SCENE COMPLEXITY

(71) Applicants: AT&T Intellectual Property I, L.P., Atlanta, GA (US); The University of Connecticut, Farmington, CT (US)

(72) Inventors: Subhabrata Sen, Westfield, NJ (US); Shuai Hao, Hillsborough, NJ (US); Krishna Pattipati, Storrs, CT (US); Yanyuan Qin, Tolland, CT (US); Bing Wang, Storrs Mansfield, CT (US)

(73) Assignees: AT&T INTELLECTUAL PROPERTY I, L.P., Atlanta, GA (US); THE UNIVERSITY OF CONNECTICUT, Farmington, CT (US)

( * ) Notice: Subject to any disclaimer, the term of this patent is extended or adjusted under 35 U.S.C. 154(b) by 0 days.

(21) Appl. No.: 16/402,573

(22) Filed: May 3, 2019

(51) Int. Cl.
*H04N 19/11* (2014.01)
*H04N 19/13* (2014.01)
(Continued)

(52) U.S. Cl.
CPC .......... *H04N 19/14* (2014.11); *H04N 19/115* (2014.11); *H04N 19/147* (2014.11); *H04N 19/176* (2014.11)

(58) Field of Classification Search
CPC .... H04N 19/14; H04N 19/115; H04N 19/134; H04N 19/152; H04N 21/24
(Continued)

(56) References Cited

U.S. PATENT DOCUMENTS 9,420,317 B2   8/2016   McCarthy et al.
9,516,085 B2   12/2016  McCarthy et al.
(Continued)

FOREIGN PATENT DOCUMENTS

JP      5840702 B2    1/2016
KR    101513119 B1    4/2015
(Continued)

OTHER PUBLICATIONS

De Cock, Jan, et al. "Complexity-based consistent-quality encoding in the cloud." 2016 IEEE International Conference on Image Processing (ICIP), IEEE, 2016. https://ieeexplore.ieee.org/abstract/document/7532605.
(Continued)

*Primary Examiner* — Jeffery A Williams

(57) ABSTRACT

Devices, computer-readable media, and methods for differential adaptive bitrate streaming based on scene complexity are disclosed. In one example, a method includes inferring, by a processor, a complexity of a scene contained in a first chunk of an adaptive bitrate streaming video, wherein the first chunk is a next chunk of the adaptive bitrate streaming video to be downloaded to an adaptive bitrate streaming video player, and wherein the complexity indicates a relative amount of spatial and temporal information contained in the scene, and selecting, by the processor, a first track from which to download the first chunk, wherein the first track is one of a plurality of tracks containing the first chunk, and wherein each track of the plurality of tracks encoded the first chunk at a different bitrate, and wherein a bitrate of the first track is proportional to the complexity of the scene as inferred.

20 Claims, 4 Drawing Sheets

(51) Int. Cl.
*H04N 19/14* (2014.01)
*H04N 19/15* (2014.01)
*H04N 21/24* (2011.01)
*H04N 19/176* (2014.01)
*H04N 19/147* (2014.01)
*H04N 19/115* (2014.01)

(58) Field of Classification Search
USPC .................................................. 375/240.02
See application file for complete search history.

(56) References Cited

U.S. PATENT DOCUMENTS

| | | | |
|---|---|---|---|
| 9,516,329 | B2 | 12/2016 | Schwartz et al. |
| 9,866,605 | B2 | 1/2018 | Begen et al. |
| 9,888,052 | B2 | 2/2018 | Botsford et al. |
| 9,967,300 | B2 | 5/2018 | Grinshpun et al. |
| 9,967,302 | B2 | 5/2018 | Lim et al. |
| 2009/0282162 | A1* | 11/2009 | Mehrotra .............. H04L 65/607 709/233 |
| 2012/0195362 | A1* | 8/2012 | Benno ................... H04N 21/222 375/240.01 |
| 2012/0311174 | A1* | 12/2012 | Bichot ............. H04N 21/44209 709/231 |
| 2017/0055012 | A1 | 2/2017 | Phillips et al. |
| 2017/0111426 | A1 | 4/2017 | Zhang et al. |
| 2018/0191796 | A1 | 7/2018 | Gandhi et al. |
| 2019/0166170 | A1* | 5/2019 | Ramaswamy ........ H04L 65/601 |

FOREIGN PATENT DOCUMENTS

| | | |
|---|---|---|
| TW | 201813410 A | 12/2018 |
| WO | 2014190308 A1 | 11/2014 |
| WO | 2016155800 A1 | 10/2016 |
| WO | 2018060489 A1 | 4/2018 |
| WO | 2018121839 A1 | 7/2018 |
| WO | 2018121990 A1 | 7/2018 |
| WO | 2018216929 A1 | 11/2018 |
| WO | 2019038738 A1 | 2/2019 |

OTHER PUBLICATIONS

Toni, Laura, et al. "Optimal selection of adaptive streaming representations." ACM Transactions on Multimedia Computing, Communications, and Applications (TOMM) 11.2s (2015): 43. http://discovery.ucl.ac.uk/1533076/1/Toni_1406.3161v2.pdf.

Qin, Yanyuan, et al. "ABR streaming of VBR-encoded videos: characterization, challenges, and solutions." Proceedings of the 14th International Conference on emerging Networking EXperiments and Technologies, ACM, 2018. https://nlab.engr.uconn.edu/papers/cava.pdf.

Grandi, Reinhard. "Per-Scene Adaptation: Going Beyond Bitrate." BitMovin, bitmovin.com, Jan. 5, 2018. https://bitmovin.com/per-scene-adaptation-going-beyond-bitrate/.

Carlsson, Niklas, et al. "Optimized adaptive streaming of multi-video stream bundles." IEEE transactions on multimedia 19.7 (2017): 1637-1653. https://liu.diva-portal.org/smash/get/diva2:1120985/FULLTEXT01.pdf.

* cited by examiner

US 10,827,181 B1

DIFFERENTIAL ADAPTIVE BITRATE STREAMING BASED ON SCENE COMPLEXITY

The present disclosure relates generally to adaptive bitrate streaming videos, and relates more particularly to devices, non-transitory computer-readable media, and methods for differential adaptive bitrate streaming based on scene complexity.

BACKGROUND

Video delivery technology has shifted from legacy protocols such as Real Time Messaging Protocol (RTMP) and Real Time Streaming Protocol (RTSP) to Hypertext Transfer Protocol (HTTP)-based, adaptive streaming protocols, such as Moving Picture Experts Group (MPEG) Dynamic Adaptive Streaming over HTTP (DASH), HTTP Live Streaming (HLS), and the like. A common feature of HTTP-based adaptive streaming protocols is the availability of video in multiple chunks associated with each time block of a video and having different encoding bitrates, with the chunks linked together by a manifest file, or "index file" that defines all of the variants/tracks (e.g., respective sets of chunks, each set at a different bitrate/encoding level) of the video.

SUMMARY

The present disclosure describes a device, computer-readable medium, and method for differential adaptive bitrate streaming based on scene complexity. In one example, a method includes inferring, by a processor, a complexity of a scene contained in a first chunk of an adaptive bitrate streaming video, wherein the first chunk is a next chunk of the adaptive bitrate streaming video to be downloaded to an adaptive bitrate streaming video player, and wherein the complexity indicates a relative amount of spatial and temporal information contained in the scene, and selecting, by the processor, a first track from which to download the first chunk, wherein the first track is one of a plurality of tracks containing the first chunk, and wherein each track of the plurality of tracks encoded the first chunk at a different bitrate, and wherein a bitrate of the first track is proportional to the complexity of the scene as inferred.

In another example, a non-transitory computer-readable storage medium stores instructions which, when executed by a processor, cause the processor to perform operations. The operations include inferring a complexity of a scene contained in a first chunk of an adaptive bitrate streaming video, wherein the first chunk is a next chunk of the adaptive bitrate streaming video to be downloaded to an adaptive bitrate streaming video player, and wherein the complexity indicates a relative amount of spatial and temporal information contained in the scene, and selecting a first track from which to download the first chunk, wherein the first track is one of a plurality of tracks containing the first chunk, and wherein each track of the plurality of tracks encoded the first chunk at a different bitrate, and wherein a bitrate of the first track is proportional to the complexity of the scene as inferred.

In another example, a system includes a processor deployed in a telecommunication service provider network and a non-transitory computer-readable storage medium stores instructions which, when executed by the processor, cause the processor to perform operations. The operations include inferring a complexity of a scene contained in a first chunk of an adaptive bitrate streaming video, wherein the first chunk is a next chunk of the adaptive bitrate streaming video to be downloaded to an adaptive bitrate streaming video player, and wherein the complexity indicates a relative amount of spatial and temporal information contained in the scene, and selecting a first track from which to download the first chunk, wherein the first track is one of a plurality of tracks containing the first chunk, and wherein each track of the plurality of tracks encoded the first chunk at a different bitrate, and wherein a bitrate of the first track is proportional to the complexity of the scene as inferred.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
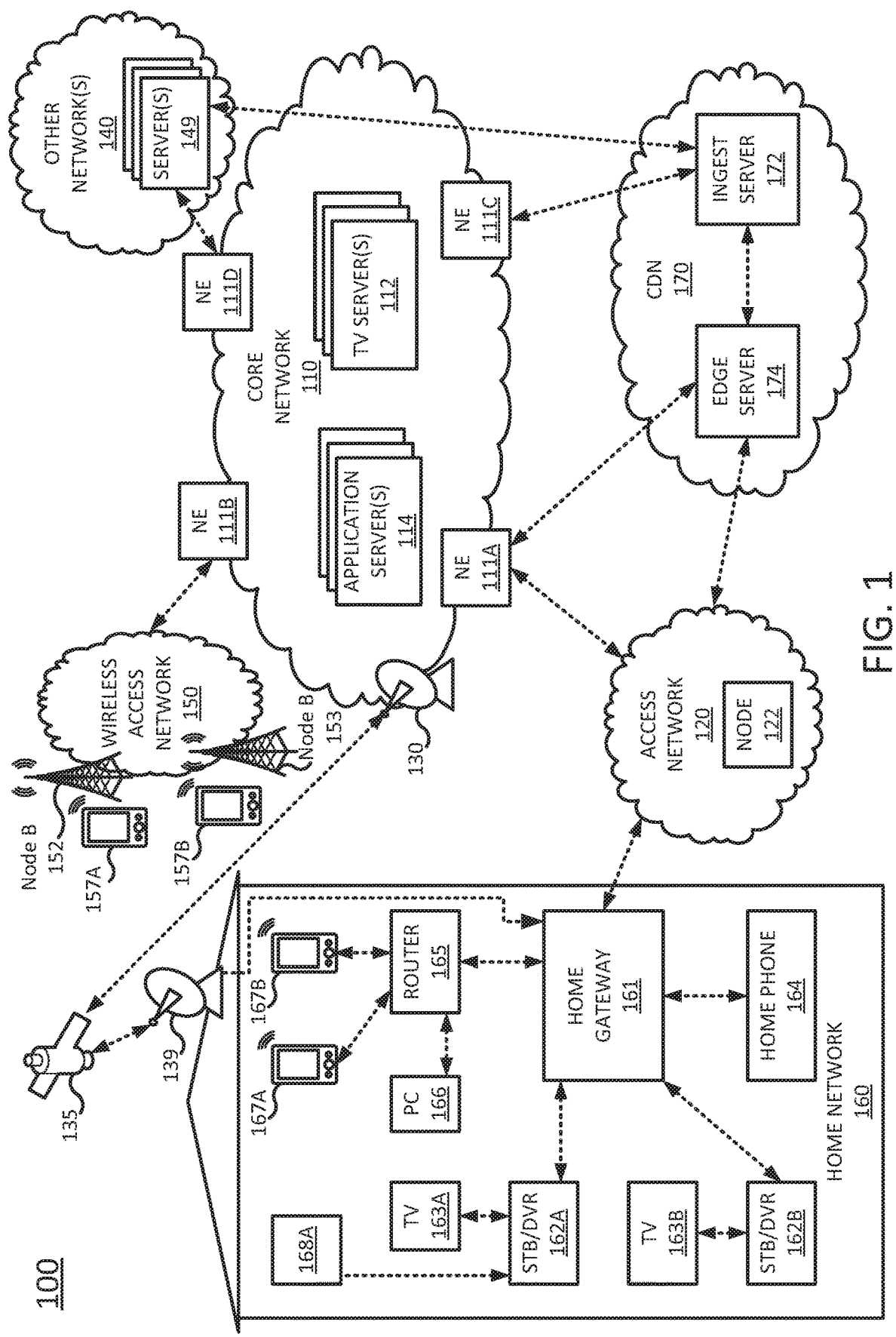
FIG. 1 illustrates an example network related to the present disclosure.

In one example, the present disclosure describes a device, computer-readable medium, and method for differential adaptive bitrate streaming based on scene complexity. As discussed above, video delivery technology has shifted to HTTP-based, adaptive streaming protocols (e.g., MPEG DASH, HLS, and the like). A common feature of HTTP-based adaptive streaming protocols is the availability of video in multiple chunks associated with each time block of a video and having different encoding bitrates, with the chunks linked together by a manifest file, or "index file" that defines all of the variants/tracks (e.g., respective sets of chunks, each set at a different bitrate/encoding level) of the video.

In one example, a video chunk (broadly a "chunk") may comprise a sequence of video and/or audio frames for a time block of a video that is encoded at a particular bitrate (e.g., a target bitrate, or "encoding level"). In one example, a chunk may also be referred to as a segment, when the chunks of an adaptive bitrate video are stored as individual data files separate from other chunks. In such an example, the chunk (e.g., a segment) may be obtained by a requesting device, such as a player device, via a uniform resource locator (URL) identifying a file containing the chunk. In another example, a chunk may be stored and/or made available as a portion of a file which may contain multiple chunks or even an entire variant/track (i.e., stream containing the video). In this case, the chunk may be referred to as a "fragment." In addition, such a chunk (e.g., a fragment) may be obtained via a URL identifying the file containing the chunk and a byte range, timestamp, index, sequence number, or the like to distinguish the chunk from other chunks in the same file. The URL(s) and other information that may be used by a player device to request and obtain chunks of an adaptive bitrate video may be stored in a manifest file which may be obtained by the player device in advance of a streaming session.

A time block of an adaptive bitrate video may have multiple associated chunks encoded at different respective bitrates. In particular, each of these associated chunks may be of a respective variant for the video. In addition, each variant may comprise a set of chunks encoded at a same bitrate (e.g., a target bitrate) and covering successive time blocks so as to constitute a complete copy of the video at the (target) bitrate for that variant. The time blocks may have a duration that is defined in advance in accordance with an adaptive bitrate protocol and/or set according to a preference of a video player vendor, a video service provider, a network operator, a video creator, a transcoder vendor, and so forth. In one example, chunks may be associated with particular time blocks of a video via sequence numbers, index numbers/indices, or the like which indicate a relative (temporal) order of the time blocks within the overall video. For instance, time block indicators for each available chunk may be included in the manifest file so that a player device may determine which chunks may be requested for each time block and so that the player device may determine which chunk(s) to request next (e.g., for successive time blocks).

Two common compression schemes for encoding video tracks are constant bitrate (CBR) and variable bitrate (VBR). CBR attempts to encode the entire track at a relatively fixed bitrate by varying the quantization parameter (and hence the quality) across different scenes. VBR attempts to encode relatively simple scenes (e.g., low motion or low complexity scenes) with fewer bits, while encoding more complex scenes (e.g., high motion or high complexity scenes) with more bits, while maintaining a more consistent quality throughout the track. Thus, VBR may deliver better video quality than CBR for the same average bitrate, or lower bitrate encoding than CBR for the same equivalent video quality. However, CBR produces a more consistent chunk size than VBR, since with VBR the chunk size tends to vary with the complexity of the scene being encoded.

A variety of factors may affect a viewer's quality of experience (QoE) for video streaming. In general, good QoE can be provided by simultaneously achieving the following conflicting goals: (1) maximize the playback bitrate for high video quality; (2) minimize the likelihood that the video player's buffer becomes empty, which may cause the video playback to stall; and (3) minimize the variability of the selected video bitrates for a smooth viewing experience. Achieving all three of these goals simultaneously is challenging due to the variability of network conditions.

Adaptive bitrate (ABR) streaming over HTTP is widely adopted since it offers significant advantages in terms of both user-perceived quality and resource utilization for content and network service providers. Unlike video downloads that must complete fully before playback can begin, streaming video starts playing within seconds. With ABR-based streaming, each video is encoded at a number of different rates (called variants or tracks) and stored on servers as separate files. A video client running on a mobile device, home television, game console, web browser, or the like chooses which video rate to stream by monitoring network conditions and estimating the available network capacity.

The function of the ABR algorithm is to select ABR variants (called representations in DASH) in real time to maximize video quality and minimize rebuffering events. Typically, a video client maintains a media cache (also referred to as a "buffer" or "video buffer"), by pre-fetching video chunks, then playback occurs from the cache. For each time block of a video-on-demand (VoD) program/live channel, the video client selects which variant (chunk) of that time block to download into the cache. Higher quality chunks for a given time block are larger in size (data volume) and take longer to download than lower quality chunks. In general, the goal is to download as high quality a chunk as possible each time while keeping the buffer from going empty.

One approach to variant or chunk selection is channel capacity estimation, which uses chunk download time as an estimate of available channel bitrate. The video client selects a chunk of a variant having a bitrate/encoding level that most closely matches the channel bitrate without exceeding it. In an environment where throughput is highly variable, such as a mobile network, accurate estimation of future channel capacity is challenging.

Another approach uses a current buffer level (e.g., a measure of an amount of time of video stored in the buffer to be played out), instead of estimated channel bandwidth, to select the bitrate/encoding level of the next chunk. As with capacity estimation, the objective is to balance the flow of data into the buffer with the outflow, to keep the buffer from going empty or overflowing. Unlike with channel capacity estimation, for buffer occupancy-based approach, the actual buffer level is used to select the next chunk, e.g., with a linear, or approximately linear, mapping function. The higher the current buffer level, the higher the bitrate selected for the next chunk for the next time block, and vice versa: the lower the buffer level, the lower the variant bitrate selected. This ensures conservative behavior, e.g., selecting minimum quality/chunk size, when the buffer is low, i.e., filling the buffer more quickly using a chunk of a lower variant and aggressive behavior, e.g., selecting maximum quality/chunk size, when the buffer is full or nearly so, i.e., filling the buffer more slowly using a chunk of a higher variant.

In response to bandwidth drops and/or buffer depletion, a client may request a chunk for the same time block at a lower quality level (lower bitrate variant) and may discard the partially downloaded chunk, which results in bandwidth waste. This also increases the chance of playback stalls, and leads to a lower average bitrate of the chunks downloaded and more frequent quality switches.

Moreover, manifest files are typically designed for CBR encoding, which assumes that all chunks are approximately equal in size. Thus, the manifest files may specify only the bitrate of a chunk. However, if VBR encoding is used, then the sizes of the chunks may vary with the complexity of the scenes the chunks contain, as discussed above. In this case, chunk download time may vary not only with the chunk bitrate, but also with the chunk size. A video player attempting to download a chunk may not know which encoding scheme was used, but may assume CBR based on the fact that the manifest file only specifies bitrate. Accordingly, the player, in attempting to conserve bandwidth, may download a lower bitrate (e.g., lower quality) chunk when the network conditions could have supported download of a higher bitrate chunk (for instance, a higher bitrate chunk may be downloaded relatively quickly if the scene complexity is low). Thus, selecting chunks for download based only peak bitrates may ultimately result in lower quality video being presented to the viewer.

In contrast, examples of the present disclosure provide improved bandwidth efficiency, while maintaining the video quality and visual stability. For instance, examples of the present disclosure develop metrics, based on novel decision factors, which capture the QoE for ABR streaming of VBR encoded video. These metrics consider, for example, chunk size, which is a good indicator of scene complexity as noted above. For instance, larger chunks tend to contain more spatial and temporal information than smaller chunks. Scene complexity also tends to be consistent across different tracks. That is, a chunk that is small in a first track (when encoded at a first bitrate) will also be small in a second track (when encoded at a second bitrate).

For less complex scenes, the improvement in quality from one bitrate to the next higher bitrate may be barely perceptible to the human eye. However, for more complex scenes, the improvement in quality from one bitrate to the next higher bitrate may be much more noticeable. With this in mind, in one example, the relative complexity of a scene contained in a video chunk may be inferred from the relative size of the chunk. For instance, a chunk whose size is larger than the average chunk size will typically contain a scene having greater than average complexity. An adaptive bitrate streaming video player may then select the track to download based on the complexity of the chunk.

Thus, examples of the present disclosure may, upon inferring that the next chunk of a video to be downloaded contains a scene with relatively low complexity, elect to download the chunk from a track that is of a slightly lower bitrate than the highest bitrate that can be supported by the current network conditions. The reasoning for such an election may be two-fold. For one, as noted above, the difference in video quality for the low complexity scene, when going from the highest bitrate track to the next highest bitrate track, may be barely noticeable to the viewer. For two, downloading the lower bitrate track may conserve bandwidth that may be needed to download a higher bitrate track a few chunks later (e.g., if a more complex scene is coming up and/or if network conditions change). Thus, in some examples, when determining which track to download for a next video chunk, an adaptive bitrate streaming video player may look not just at the size of the next chunk, but also at the sizes of several chunks that follow the next chunk.

In further examples, looking at the sizes of chunks that follow the next chunk may also help to make transitions in video quality less jarring to the viewer. For instance, if network conditions are detected to be unstable or changing, an adaptive bitrate streaming video player may begin to download chunks whose bitrates are incrementally reduced. For instance, a first chunk may be selected from a first track having a first bitrate, then a second chunk may be selected from a second track having a second bitrate that is slightly lower than the first bitrate, then a third chunk may be selected from a third track having a third bitrate that is slightly lower than the second bitrate. The transition in video quality when going from the first bitrate to the second bitrate to the third bitrate may be less jarring than going directly from the first bitrate to the third bitrate.

Thus, examples of the present disclosure leverage the relationship between chunk size and scene complexity to enhance the viewer experience of VBR streaming (e.g., to provide the highest possible quality video content while reducing stalls and jarring transitions). Within the context of the present disclosure, the "complexity" of a scene may be understood to refer to one or more characteristics of a scene, including, but not limited to, the scene's spatial information, temporal information, and peak signal-to-noise ratio. For instance, a medium or long shot scene of a high-speed car chase is more complex than a close-up scene of a single character presenting a monologue.

Examples, of the present disclosure may be practically implemented within any existing HAS system. The video player downloads a metadata file (such as the manifest file, or media presentation description (MPD) in DASH), which contains information about variant quality levels (e.g., bitrate, resolution, frame rate, etc.). The metadata file may include additional information on video chunk size, offset (e.g., the number of reference frames) and per-chunk loss tolerance levels. The video player may use this information to dynamically select a track or variant from which to select a next video chunk (or a next several video chunks) for download.

In short, examples of the present disclosure deliver better viewer QoE (i.e., defined, in the context of the present disclosure, as high average video quality with fewer than average quality variations and stalls) when compared with state of the art ABR streaming schemes, while incurring a relatively small computational overhead. For instance, the run-time overhead for a ten-minute video has been experimentally shown to be as low as fifty six milliseconds.

It should also be noted that although examples of the present disclosure are described primarily in connection with a video client and video streaming, examples of the present disclosure may be similarly applied to other types of streaming media, such as adaptive bitrate streaming audio. In addition, although aspects of the present disclosure may be most applicable in the context of live streaming with shallow buffers, the present disclosure may be equally applicable to on-demand streaming of recorded programs. These and other aspects of the present disclosure are described in greater detail below in connection with the examples of FIGS. 1-4.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A and 162B, television (TV) 163A and TV 163B, home phone 164, router 165, personal computer (PC) 166, and so forth, with one another and with various other devices via a core network 110, a wireless access network 150 (e.g., a cellular network), an access network 120, other networks 140, content distribution network (CDN) 170, and/or the Internet in general. For instance, connections between core network 110, access network 120, home network 160, CDN 170, wireless access network 150 and other networks 140 may comprise the Internet in general, internal links under the control of single telecommunication service provider network, links between peer networks, and so forth.

In one example, wireless access network 150 may comprise a radio access network implementing such technologies as: Global System for Mobile Communication (GSM), e.g., a Base Station Subsystem (BSS), or IS-95, a Universal Mobile Telecommunications System (UMTS) network employing Wideband Code Division Multiple Access (WCDMA), or a CDMA3000 network, among others. In other words, wireless access network 150 may comprise an access network in accordance with any "second generation" (2G), "third generation" (3G), "fourth generation" (4G), Long Term Evolution (LTE), "fifth generation" (5G) or any other yet to be developed future wireless/cellular network technology. While the present disclosure is not limited to any particular type of wireless access network, in the illustrative example, wireless access network 150 is shown as a UMTS terrestrial radio access network (UTRAN) subsystem. Thus, elements 152 and 153 may each comprise a Node B or evolved Node B (eNodeB). In one example, wireless access network 150 may be controlled and/or operated by a same entity as core network 110.

In one example, each of the mobile devices 157A, 157B, 167A, and 167B may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple play services include telephone services, Internet services and television services to subscribers. For example, core network 110 may functionally comprise a fixed mobile convergence (FMC) network, e.g., an IP Multimedia Subsystem (IMS) network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP) network. The network elements 111A-111D may serve as gateway servers or edge routers to interconnect the core network 110 with other networks 140, wireless access network 150, access network 120, and so forth. As shown in FIG. 1, core network 110 may also include a plurality of television (TV) servers 112, and a plurality of application servers 114. For ease of illustration, various additional elements of core network 110 are omitted from FIG. 1.

With respect to television service provider functions, core network 110 may include one or more television servers 112 for the delivery of television content, e.g., a broadcast server, a cable head-end, and so forth. For example, core network 110 may comprise a video super hub office, a video hub office and/or a service office/central office. In this regard, television servers 112 may include content server(s) to store scheduled television broadcast content for a number of television channels, video-on-demand (VoD) programming, local programming content, and so forth. Alternatively, or in addition, content providers may stream various contents to the core network 110 for distribution to various subscribers, e.g., for live content, such as news programming, sporting events, and the like. Television servers 112 may also include advertising server(s) to store a number of advertisements that can be selected for presentation to viewers, e.g., in the home network 160 and at other downstream viewing locations. For example, advertisers may upload various advertising content to the core network 110 to be distributed to various viewers. Television servers 112 may also include interactive TV/video-on-demand (VoD) server(s) and/or network-based digital video recorder (DVR) servers, as described in greater detail below.

In one example, the access network 120 may comprise a Digital Subscriber Line (DSL) network, a broadband cable access network, a Local Area Network (LAN), a cellular or wireless access network, a $3^{rd}$ party network, and the like. For example, the operator of core network 110 may provide a cable television service, an IPTV service, or any other types of television service to subscribers via access network 120. In this regard, access network 120 may include a node 122, e.g., a mini-fiber node (MFN), a video-ready access device (VRAD) or the like. However, in another example, node 122 may be omitted, e.g., for fiber-to-the-premises (FTTP) installations. Access network 120 may also transmit and receive communications between home network 160 and core network 110 relating to voice telephone calls, communications with web servers via other networks 140, content distribution network (CDN) 170 and/or the Internet in general, and so forth. In another example, access network 120 may be operated by a different entity from core network 110, e.g., an Internet service provider (ISP) network.

Alternatively, or in addition, the network 100 may provide television services to home network 160 via satellite broadcast. For instance, ground station 130 may receive television content from television servers 112 for uplink transmission to satellite 135. Accordingly, satellite 135 may receive television content from ground station 130 and may broadcast the television content to satellite receiver 139, e.g., a satellite link terrestrial antenna (including satellite dishes and antennas for downlink communications, or for both downlink and uplink communications), as well as to satellite receivers of other subscribers within a coverage area of satellite 135. In one example, satellite 135 may be controlled and/or operated by a same network service provider as the core network 110. In another example, satellite 135 may be controlled and/or operated by a different entity and may carry television broadcast signals on behalf of the core network 110.

As illustrated in FIG. 1, core network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. In one example, application servers 114 may include data storage servers to receive and store manifest files regarding adaptive bitrate streaming videos maintained within TV servers 112 and/or available to subscribers of core network 110 and stored in server(s) 149 in other networks 140. It should be noted that the foregoing are only several examples of the types of relevant application servers 114 that may be included in core network 110 for storing information relevant to providing various services to subscribers.

In accordance with the present disclosure, other networks 140 and servers 149 may comprise networks and devices of various content providers of ABR and/or VBR videos. In one example, each of servers 149 may also make available manifest files which describe the variants of a video and the segments/video chunks thereof which are stored on the respective one of the servers 149. For instance, there may be several video chunks containing video and audio for the same time block (e.g., a 2-10 second portion) of the video, but which are encoded at different bitrates in accordance with an adaptive bitrate streaming protocol or a variable bitrate streaming protocol. Thus, an adaptive bitrate streaming video player may request and obtain any one of the different video chunks for the time block, e.g., depending upon a state of a video buffer of the adaptive bitrate streaming video player, depending upon network bandwidth or other network conditions, depending upon the access rights of the adaptive bitrate streaming video player to different variants (e.g., to different encoding levels/bitrates) according to a subscription plan and/or for the particular video, and so forth.

In one example, home network 160 may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs)/digital video recorders (DVRs) 162A and 162B to be decoded, recorded, and/or forwarded to television (TV) 163A and TV 163B for presentation. Similarly, telephone data is sent to and received from home phone 164; Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions is a smart TV. In one example, router 165 may comprise a wired Ethernet router and/or an Institute for Electrical and Electronics Engineers (IEEE) 802.11 (Wi-Fi) router, and may communicate with respective devices in home network 160 via wired and/or wireless connections.

Figure 3:
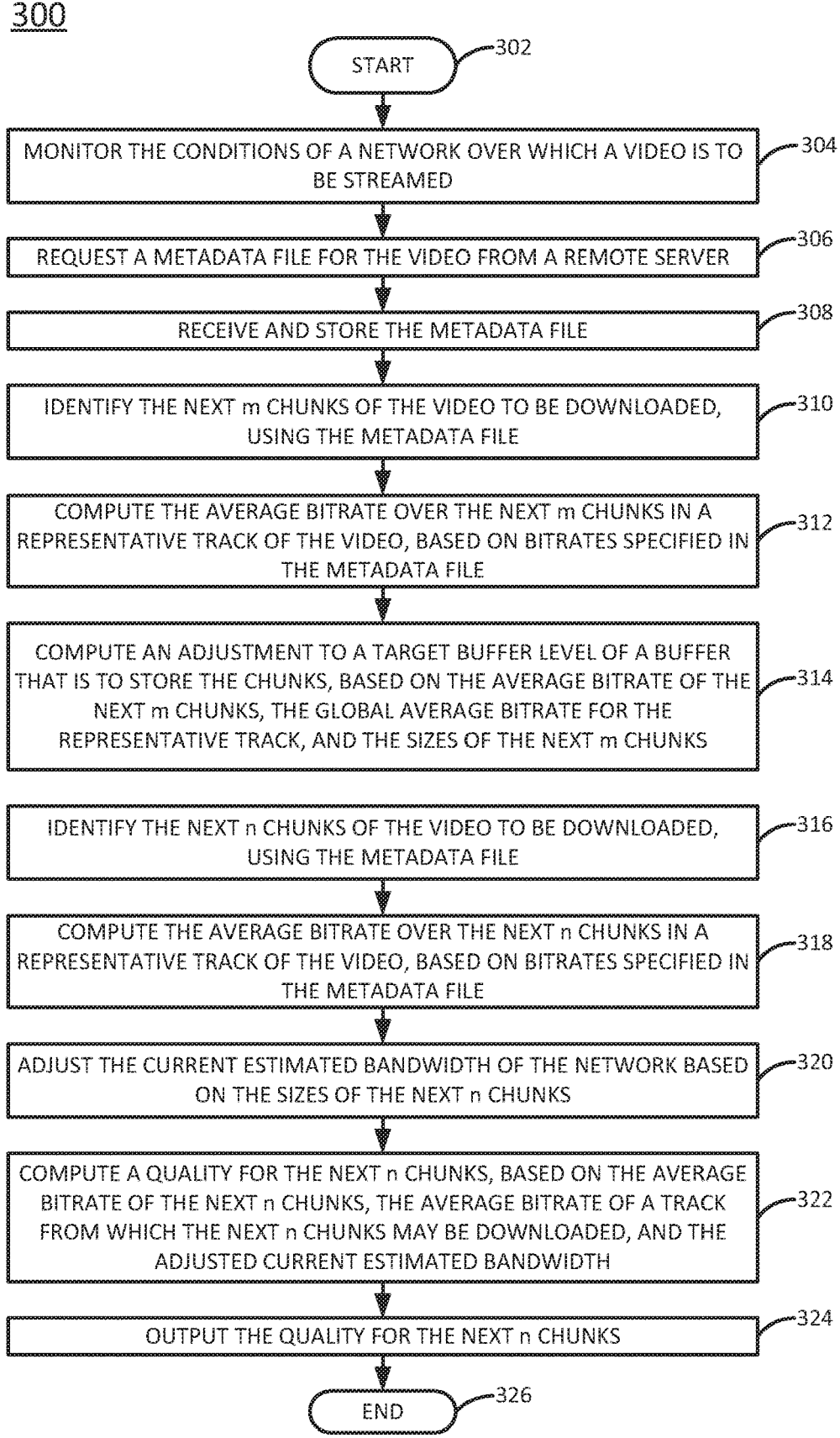
FIG. 3 illustrates a flowchart of a method for differential adaptive bitrate streaming based on scene complexity, in accordance with the present disclosure.

In one example, one or both of the STB/DVR 162A and STB/DVR 162B may comprise all or a portion of a computing device or system, such as computing system 400, and/or processing system 402 as described in connection with FIG. 4 below, specifically configured to perform various steps, functions, and/or operations for differential adaptive bitrate streaming based on scene complexity. Among other functions, STB/DVR 162A and STB/DVR 162B may comprise adaptive bitrate streaming video players capable of playing adaptive bitrate streaming videos in formats such as H.264 (Advanced Video Coding (AVC)), H.265 (High Efficiency Video Coding (HEVC)), Moving Picture Expert Group (MPEG) .mpeg files, .mov files, .mp4 files, 0.3gp files, .f4f files, .m3u8 files, or the like. A flowchart of an example method for differential adaptive bitrate streaming based on scene complexity is illustrated in FIG. 3 and described in greater detail below. Although STB/DVR 162A and STB/DVR 162B are illustrated and described as integrated devices with both STB and DVR functions, in other, further, and different examples, STB/DVR 162A and/or STB/DVR 162B may comprise separate STB and DVR devices.

It should be noted that in one example, another device may provide one or more operations or functions for differential adaptive bitrate streaming based on scene complexity, as described herein, and may comprise an adaptive bitrate streaming video player capable of playing adaptive bitrate streaming videos and/or variable bitrate streaming videos. For instance, one or more of mobile devices 157A, 157B, 167A and 167B, and/or PC 166 may also comprise all or a portion of a computing device or system, such as computing system 400, and/or processing system 402 as described in connection with FIG. 4 below, specifically configured to perform various steps, functions, and/or operations for differential adaptive bitrate streaming based on scene complexity, as described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

Network 100 may also include a content distribution network (CDN) 170. In one example, CDN 170 may be operated by a different entity from the core network 110. In another example, CDN 170 may be operated by a same entity as the core network 110, e.g., a telecommunication service provider. In one example, the CDN 170 may comprise a collection of cache servers distributed across a large geographical area and organized in a tier structure. The first tier may comprise a group of servers that accesses content web servers (e.g., origin servers) to pull content into the CDN 170, referred to as an ingestion servers, e.g., ingest server 172. The content may include videos, content of various webpages, electronic documents, video games, etc. A last tier may comprise cache servers which deliver content to end user, referred to as edge caches, or edge servers, e.g., edge server 174. For ease of illustration, a single ingest server 172 and a single edge server 174 are shown in FIG. 1. In between the ingest server 172 and edge server 174, there may be several layers of servers (omitted from the illustrations), referred to as the middle tier. In one example, the edge server 174 may be multi-tenant, serving multiple content providers, such as core network 110, content providers associated with server(s) 149 in other network(s) 140, and so forth. In one example, edge server 174 may comprise an adaptive bitrate streaming video server. In addition, in one example, ingest server 172 and/or edge server 174 may comprise all or a portion of a computing device or system, such as computing system 400, and/or processing system 402 as described in connection with FIG. 4 below, specifically configured to perform various steps, functions, and/or operations in connection with processing frames of a video chunk received in a designated order comprising a plurality of intra-frame coded frames followed by a plurality of inter-frame coded frames, and/or recording a video chunk in a designated order comprising a plurality of intra-frame coded frames followed by a plurality of inter-frame coded frames.

As mentioned above, TV servers 112 in core network 110 may also include one or more interactive TV/video-on-demand (VoD) servers and/or network-based DVR servers. In one example, an interactive TV/VoD server and/or DVR server may comprise all or a portion of a computing device or system, such as computing system 400, and/or processing system 402 as described in connection with FIG. 4 below, specifically configured to perform various steps, functions, and/or operations in connection with differential adaptive bitrate streaming based on scene complexity, as described herein. Among other things, an interactive TV/VoD server and/or network-based DVR server may function as a server for STB/DVR 162A and/or STB/DVR 162B, one or more of mobile devices 157A, 157B, 167A and 167B, and/or PC 166 operating as a client for requesting and receiving a manifest file for an adaptive bitrate streaming video, as described herein. For example, STB/DVR 162A may present a user interface and receive one or more inputs (e.g., via remote control 168A) for a selection of an adaptive bitrate streaming video. STB/DVR 162A may request the video from an interactive TV/VoD server and/or network-based DVR server, which may retrieve the manifest file for the video from one or more of application servers 114 and provide the manifest file to STB/DVR 162A. STB/DVR 162A may then obtain video chunks of the video as identified in the manifest file.

In one example, the manifest file may direct the STB/DVR 162A to obtain the video chunks from edge server 174 in CDN 170. The edge server 174 may already store the video chunks of the video and may deliver the video chunks upon a request from the STB/DVR 162A. However, if the edge server 174 does not already store the video chunks, upon request from the STB/DVR 162A, the edge server 174 may in turn request the video chunks from an origin server. The origin server which stores chunks of the video may comprise, for example, one of the servers 149 or one of the TV servers 112. The chunks of the video may be obtained from an origin server via ingest server 172 before passing to edge server 174. In one example, the ingest server 172 may also pass the video chunks to other middle tier servers and/or other edge servers (not shown) of CDN 170. The edge server 174 may then deliver the video chunks to the STB/DVR 162A and may store the video chunks until the video chunks are removed or overwritten from the edge server 174 according to any number of criteria, such as a least recently used (LRU) algorithm for determining which content to keep in the edge server 174 and which content to delete and/or overwrite.

It should be noted that a similar process may involve other devices, such as TV 163A or TV 163B (e.g., "smart" TVs), mobile devices 167A, 167B, 157A or 157B obtaining a manifest file for a video from one of the TV servers 112, from one of the servers 149, etc., and requesting and obtaining video chunks of the video from edge server 174 of CDN 170. In this regard, it should be noted that edge server 174 may comprise a server that is closest to the requesting device geographically or in terms of network latency, throughput, etc., or which may have more spare capacity to serve the requesting device as compared to other edge servers, which may otherwise best serve the video to the requesting device, etc. However, depending upon the location of the requesting device, the access network utilized by the requesting device, and other factors, the chunks of the video may be delivered via various networks, various links, and/or various intermediate devices. For instance, in one example, edge server 174 may deliver video chunks to a requesting device in home network 160 via access network 120, e.g., an ISP network. In another example, edge server 174 may deliver video chunks to a requesting device in home network 160 via core network 110 and access network 120. In still another example, edge server 174 may deliver video chunks to a requesting device such as mobile device 157A or 157B via core network 110 and wireless access network 150.

It should also be noted that in accordance with the present disclosure, any one or more devices of system 100 may perform operations for differential adaptive bitrate streaming based on scene complexity, as described herein, such as one or more of application servers 114, TV servers 112, ingest server 172, edge server 174, one or more of servers 149, and so forth. For instance, any one or more of such devices may comprise a processing system to create video chunks for variants of ABR videos. In addition, any of the devices of system 100 that may comprise an adaptive bitrate streaming video player, such as STB/DVR 162A, STB/DVR 162B, TV 163A, TV 163B, PC 166, mobile devices 167A, 167B, 157A, and 157B, and so on, may also be configured to receive and play-out video chunks, as described herein.

Further details regarding the functions that may be implemented by application servers 114, TV servers 112, ingest server 172, servers 149, STBs/DVRs 162A and 162B, TV 163A, TV 163B, mobile devices 157A, 157B, 167A and 167B, and/or PC 166 are discussed in greater detail below in connection with the examples of FIGS. 2-4. In addition, it should be noted that the network 100 may be implemented in a different form than that which is illustrated in FIG. 1, or may be expanded by including additional endpoint devices, access networks, network elements, application servers, etc. without altering the scope of the present disclosure. For example, core network 110 is not limited to an IMS network. Wireless access network 150 is not limited to a UMTS/UTRAN configuration. Similarly, the present disclosure is not limited to an IP/MPLS network for VoIP telephony services, or any particular type of broadcast television network for providing television services, and so forth.

Figure 2:
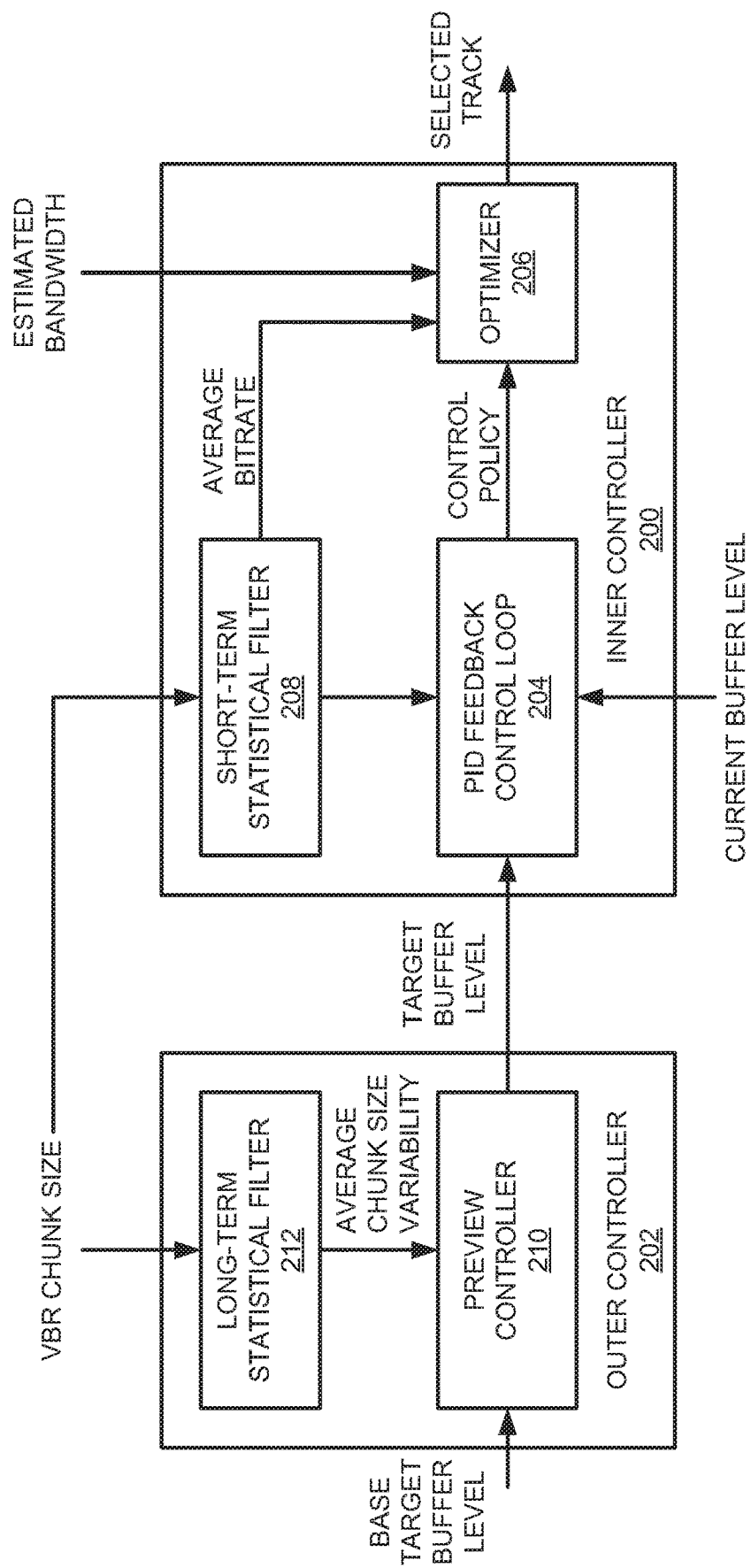
FIG. 2 illustrates an example pair of controllers for implementing examples of the present disclosure.

FIG. 2 illustrates an example pair of controllers for implementing examples of the present disclosure. The pair of controllers includes an inner controller 200 (broadly a first controller) and an outer controller 202 (broadly a second controller). In one example, the inner controller 200 and the outer controller 202 may be implemented in a user endpoint device, e.g., an ABR video player/client device such as STB/DVR 162A, STB/DVR 162B, one of the TVs 163A or 163B, PC 166, one of the mobile devices 157A, 157B, 167A, or 167B, and so forth, or any one more components thereof, such as a processing system, or by one of these devices in conjunction with other devices and/or components of network 100 of FIG. 1. In another example, the inner controller 200 and the outer controller 202 may be implemented in the cloud, e.g., in a cloud agent device such as one of the application servers 114 or any one more components thereof, such as a processing system, or by one of these devices in conjunction with other devices and/or components of network 100 of FIG. 1.

The inner controller 200 and the outer controller 202 cooperate to select video chunks to download to an ABR video player in a manner that maximizes the viewer's quality of experience. At a high level, the inner controller 200 may determine, for the next chunk to be downloaded, which track level to select, while the outer controller may adjust a target fill level for a video player's buffer to avoid rebuffering.

In one example, the inner controller 200 comprises a proportional-integral-derivative (PID) feedback control loop 204 and an optimizer 206. The PID feedback control loop 204 may be used to generate a control policy for the ABR video player, where the control policy determines the ABR video player's buffer filling rate, i.e., how quickly the ABR video player's buffer, which temporarily stores downloaded video chunks, should be filled.

In one example, the buffer dynamics may be characterized by:

$$\dot{x}_t = \begin{cases} C_t / R_t(l_t) & \text{if } t \leq \delta \\ \dfrac{C_t}{R_t(l_t)} - 1(x_t - \Delta), & \text{otherwise} \end{cases} \quad \text{(EQN. 1)}$$

where $x_t$ is the current fill level of the buffer, $C_t$ is the current bandwidth, $\Delta$ is the chunk size, $\delta$ is the startup latency, and $R_t(l_t)$ is the bitrate selection.

The control policy, $u_t$, may, in turn, be defined as:

$$u_t = K_p(x_r - x_t) + K_i \int_0^t (x_r - x_t)dt + 1(x_t - \Delta) \quad \text{(EQN. 2)}$$

where $K_p$ is the proportional gain, $K_i$ is the integral gain, $x_r$ is the target (e.g., threshold) buffer level.

The control policy determined by the PID feedback control loop may be forwarded to the optimizer 206. The optimizer 206 may use the control policy to select the quality level (e.g., bitrate or track) for the next video chunk to be downloaded. In one example, the optimizer attempts to balance the video quality with the changes in video quality, e.g., to maximize bandwidth utilization while minimizing changes in the level of video quality. In one example, the optimizer 206 achieves this balance by solving a regularized least squares problem.

In one example, the optimizer 206 may apply a relatively short-term statistical filter 208 to the sizes of the next n chunks to be downloaded. In this case, n is a configurable parameter. For instance, setting n to a smaller number may minimize bandwidth consumption and processing power, but result in greater quality variability from chunk to chunk. However, setting n to a larger number may provide greater quality consistency from chunk to chunk while consuming greater bandwidth and processing power. In one example, when determining which track to select for chunk position i, the short-term statistical filter 208 may compute the average bitrate over the next n chunks. The optimizer 206 may then use the computed average bitrate over the next n chunks as the representative bitrate associated with the chunk position i in an optimization formulation.

In one example, the optimization formulation may be framed as:

$$Q(l_t) = \sum_{k=t}^{t+N-1} \left(u_k \bar{R}_t(l_t) - \alpha_t \hat{C}_k\right) + \eta_t(r(l_t) - r(l_{t-1}))^2 \quad \text{(EQN. 3)}$$

where $\bar{R}_t(l_t)$ is the average bitrate over a window of n chunks, $r(l)$ is the average bitrate of track l, and $\alpha_t$ is the weight for the estimated network bandwidth. $Q(l_t)$ is the optimal quality (e.g., expressed in terms of track bitrate) of the chunk based on the foregoing factors. In the first term, i.e., $$\sum_{k=t}^{t+N-1} \left(u_k \bar{R}_t(l_t) - \alpha_t \hat{C}_k\right),$$

the short-term average of the next n chunk sizes is used. For chunks with different complexity, different weights $\alpha_t$ may be applied to the estimated network bandwidth. Heuristics may be used to avoid low buffer levels for Q1-Q3 chunks (i.e., chunks having sizes that fall within the first through third quartiles for chunk size distribution) and to avoid stalls. For the second term, i.e., $\eta_t(r(l_t)-r(l_{t-1}))^2$, changes in video quality (e.g., bitrate) may not be penalized if the current and previous chunks have sizes that fall within different quartiles (e.g., Q1-Q3 versus Q4) for chunk size distribution. This addresses the varying importance of the different quartiles in viewing quality.

The optimizer 206 may also adjust the current estimated bandwidth to favor more complex scenes. This approach may be referred to as "differential treatment." For instance, where a scene to be downloaded is inferred to be relatively complex, the optimizer 206 may inflate the estimated bandwidth to allow for greater resource usage and achieve higher video quality. Conversely, for a less complex scene, the optimizer 206 may deflate the estimated bandwidth to conserve resources and achieve a lesser video quality. In some cases, however, there may be exceptions to this rule based on the fill level of the video player's buffer.

For instance, if the current chunk to be downloaded is not a Q4 chunk (i.e., a chunk that has a size falling within the fourth quartile for chunk size distribution), and the selected track is a relatively low quality track (e.g., lowest or second lowest possible bitrate), then under the above-described bandwidth adjustment strategy, while the fill level of the video player's buffer is above a configurable threshold that indicates a low risk of stalls (e.g., x seconds), the current estimated bandwidth may not be deflated. This will avoid the selection of unnecessarily low quality tracks for Q1-Q3 chunks. Similarly if the current chunk to be downloaded is a Q4 chunk and the video player's buffer is below the threshold (indicating a high risk of stalls), the current estimated bandwidth may not be inflated. This will avoid the introduction of additional stalls.

In one example, the outer controller 202 comprises a preview controller 210. The preview controller 210 sets a target buffer level, i.e., the configurable threshold fill level for the video player's buffer. The target buffer level may be defined in terms of seconds' worth of playback data (e.g., x seconds). Moreover, as discussed above, the target buffer level may change over time. This is because when working with VBR video, video chunk sizes may vary considerably across the video. Thus, the outer controller 202 may also comprise a long-term statistical filter 212 that obtains the average variability of the video chunk sizes from the actual VBR chunk sizes. The term of the long-term statistical filter 212 is long with respect to the short-term statistical filter 208 of the inner controller 200.

In any event, when the target buffer level is fixed and the chunk sizes vary, this may lead to frequent stalls. For example, the lower the target buffer level, the less data the video player retains in the buffer. Thus, when downloading a chunk whose size is larger than the global average (and which, consequently, might require extra time to download), the buffer would run the risk of emptying before the chunk was downloaded, especially if network bandwidth is low. When the buffer empties, the video player has nothing to play, leading to a stall.

Therefore, in some examples, the preview controller 210 may proactively and adaptively adjust the target buffer level. For instance, the preview controller 210 may increase the target buffer level, allowing the video player to download and store a greater number of chunks from a track having a lower bitrate before the network bandwidth drops too low. This allows a few more seconds' worth of data to be fetched and stored in the video player's buffer, so that rebuffering can be minimized.

As an example, consider that at time t, the video player is determining from which track to select a video chunk for chunk position i. In one example, the preview controller 210 may select one representative track (e.g., Track C), then compute an average bitrate over a window of the next m chunks (where m is configurable, and m>>n) for the representative track. The computed average bitrate may be considered a representative bitrate associated with the chunk position i for the representative track. The difference between the representative bitrate and the global average bitrate for the representative track may guide the adjustment of the target buffer level.

In one example, the amount by which to adjust the target buffer level may be calculated as:

$$(R-G)/G * m * s \qquad \text{(EQN. 4)}$$

where R is the representative bitrate, G is the global average bitrate for the representative track, and s is the size of the chunks (e.g., in seconds).

Thus, in summary, the inputs to the inner controller 200 include: the target buffer level computed by the preview controller 210 of the outer controller 202, the estimated network bandwidth, and a short-term filter of future chunk bitrate (obtained by feeding the VBR chunk sizes to the short-term statistical filter 208). The inner controller 200 then outputs the selected track, e.g., via the optimizer 206. The inputs to the outer controller 202 include the average variability of the chunk sizes (obtained by feeding the VBR chunk sizes to the long-term statistical filter 212) and a base target buffer level. The outer controller 202 then outputs the adaptive, target buffer level to the inner controller 200 (e.g., to the PID feedback control loop 204).

FIG. 3 illustrates a flowchart of a method 300 for differential adaptive bitrate streaming based on scene complexity, in accordance with the present disclosure. In one example, the method 300 is performed by an ABR video player/client device, e.g., STB/DVR 162A, STB/DVR 162B, one of the TVs 163A or 163B, PC 166, one of the mobile devices 157A, 157B, 167A, or 167B, and so forth, or any one more components thereof, such as a processing system, or by one of these devices in conjunction with other devices and/or components of network 100 of FIG. 1. In one example, the steps, functions, or operations of method 300 may be performed by a computing device or system 400, and/or a processing system 402 as described in connection with FIG. 4 below. For instance, the computing device 400 may represent any one or more components of a client device that is/are configured to perform the steps, functions and/or operations of the method 300. For illustrative purposes, the method 300 is described in greater detail below in connection with an example performed by a processing system, such as processing system 402. The method 300 begins in step 302 and proceeds to step 304.

At step 304, the processing system may monitor the conditions of a network (e.g., a core network, a content distribution network, or the like). For instance, the processing system may monitor the bandwidth of the network, as well as other conditions that may affect that streaming of video data via the network (e.g., latency, throughput). In one example, the monitoring is performed on a continuous basis. For instance, the processing system may verify the bandwidth every y seconds.

At step 306, the processing system may request a metadata file (e.g., a manifest file) from a remote server in the network. The metadata, as discussed above, may define all of the variants/tracks (e.g., respective sets of chunks, each set at a different bitrate/encoding level) of a video stored at the server. In one example, the manifest file may contain information about variant quality levels (e.g., bitrate, resolution, frame rate, etc.). The metadata file may include additional information on video chunk size, offset (e.g., the number of reference frames), and per-chunk loss tolerance levels.

In step 308, the processing system may receive the metadata file from the remote server. The metadata file may be stored locally by the processing system for use in streaming the video from the remote server, as discussed in further detail below.

In step 310, the processing system may identify the next m chunks of the video to be downloaded, where m is a configurable number. The manifest file may be consulted to identify the next m chunks of the video.

In step 312, the processing system may compute an average bitrate over the next m chunks, based on the bitrates for the chunks as specified in the metadata file. In one example, the average bitrate may be computed from the bitrates of the next m chunks of a representative track, as indicated in the manifest file. That is, the processing system may select a track from the manifest file, and compute the average bitrate over the next m chunks of the selected track. The computed average bitrate may then be used as a representative bitrate for the selected track.

In step 314, the processing system may compute an adjustment to a target buffer level for the buffer of an ABR video player/client device that is to play the video stored at the server. In one example, the target buffer level is calculated based on the average bitrate as computed in step 312, a global average bitrate for the selected track (e.g., the average bitrate over all chunks of the selected track), and the size of the m chunks (e.g., in seconds). For instance, the amount of the adjustment (e.g., in seconds of video stored) may be computed in accordance with EQN. 4, above. Thus, the amount by which the target buffer level is adjusted is based at least in part on the sizes of the next m chunks, where the sizes of the next m chunks are indicated of the complexity of the scene(s) contained in the next m chunks (e.g., the more complex the scene(s), the larger the chunk sizes).

In step 316, the processing system may identify the next n chunks of the video to be downloaded, where n is a configurable number and m>>n. The manifest file may be consulted to identify the next n chunks of the video. As discussed above, setting n to a smaller number may minimize bandwidth consumption and processing power, but result in greater quality variability from chunk to chunk. However, setting n to a larger number may provide greater quality consistency from chunk to chunk while consuming greater bandwidth and processing power.

In step 318, the processing system may compute the average bitrate over the next n chunks, based on the bitrates for the chunks as specified in the metadata file. As discussed above, the computed average bitrate for the n chunks may be taken by the processing system as a representative bitrate associated with the next chunk to be downloaded.

In step 320, the processing system may adjust the current estimated bandwidth based on the sizes (e.g., complexities) of the next n chunks. As discussed above, this approach may be referred to as "differential treatment." For instance, where a scene to be downloaded is inferred to be relatively complex (or the size of the chunk(s) containing the scene are relatively large), the optimizer 206 may inflate the estimated bandwidth to allow for greater resource usage and achieve higher video quality. Conversely, for a less complex scene (e.g., where the sizes of the chunk(s) containing the scene are relatively small), the optimizer 206 may deflate the estimated bandwidth to conserve resources and achieve a lesser video quality. In some cases, as discussed above, there may be exceptions to this rule based on the current fill level of the video player's buffer and/or the quartile for chunk size distribution into which the current chunk to be downloaded falls.

In step 322, the processing system may compute a quality for the next n chunks to be downloaded. In one example, the computation is framed as an optimization problem (e.g., a regularized least squares problem), e.g., as detailed in EQN. 3. The optimization problem may take into account the average bitrate as computed in step 318, the average bitrate of a track from which the next n chunks may be downloaded, and the estimated network bandwidth as adjusted in step 320. In one example, the quality computed attempts to balance the video quality with the changes in video quality, e.g., to maximize bandwidth utilization while minimizing changes in the level of video quality. The quality of the next n chunks may be expressed in terms of track bitrate.

In step 324, the processing system may output the quality as computed in step 322 to a component of the ABR video player/client device that is responsible for initiating the download of the next n chunks. In another example, the processing system may initiate the download of the next n chunks from the track that corresponds to the quality as computed in step 322. The next n chunks will then be downloaded to the buffer of the ABR video player/client device for playback (and evicted from the buffer sometime after playback to make room for subsequent chunks, in accordance with the buffer's fill rate).

The method 300 may end in step 326.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. In addition, one or more steps, blocks, functions, or operations of the above described method 300 may comprise optional steps, or can be combined, separated, and/or performed in a different order from that described above, without departing from the example embodiments of the present disclosure. For instance, in one example the processing system may repeat one or more steps of the method 300 by returning to step 310 after step 322 and/or after step 324. The method 300 may also be expanded to include additional steps. Thus, these and other modifications are all contemplated within the scope of the present disclosure.

Inferring scene complexity from chunk size, rather than from, for example, quality information based on video content (e.g., spatial information, temporal information, peak signal-to-noise ratio, and/or the like) has several advantages. For instance, it is simpler to infer scene complexity from the chunk size, since the inference does not require computation-heavy content-level analysis. Moreover, the chunk size is already known at the player side (e.g., from the manifest file) if current ABR standards such as DASH or HLS are in use; thus, no changes are required at the server side. Thus, leveraging the relationship between chunk size and scene complexity can significantly enhance the viewer experience of VBR streaming.

Figure 4:
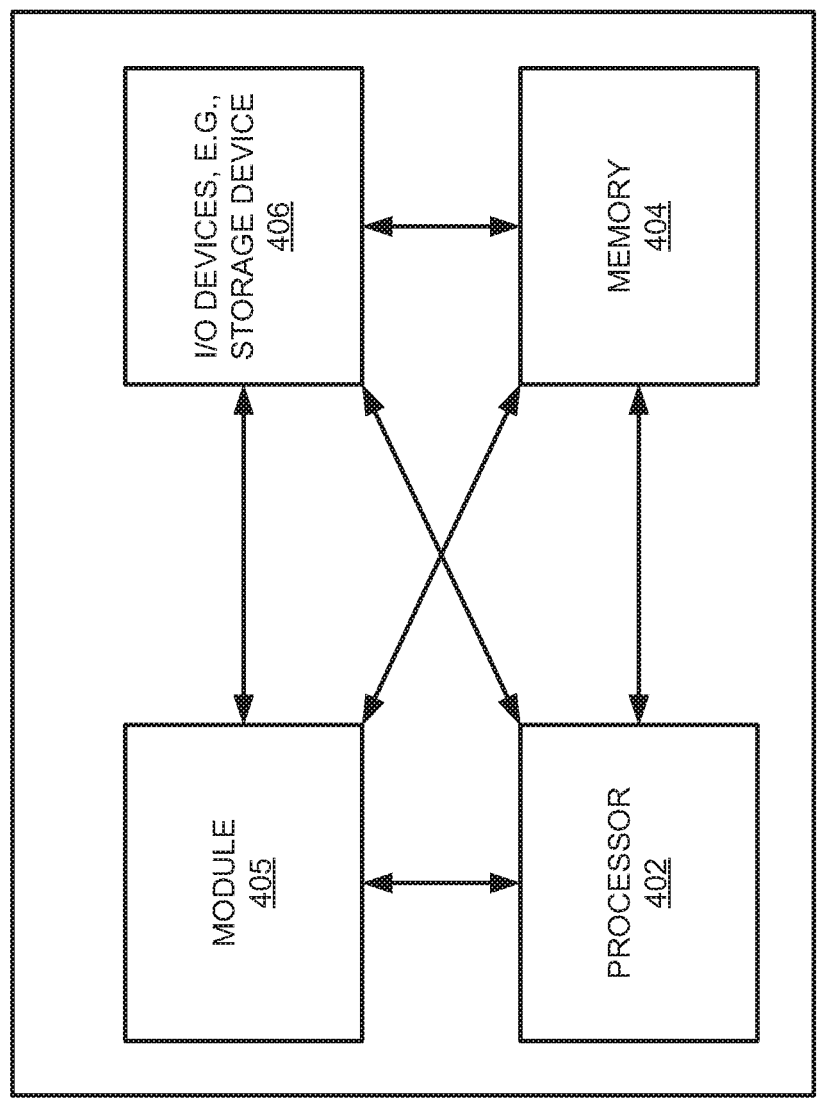
FIG. 4 illustrates a high level block diagram of a computing device specifically programmed to perform the steps, functions, blocks and/or operations described herein.

FIG. 4 depicts a high-level block diagram of a computing device or processing system specifically programmed to perform the functions described herein. For example, any one or more components or devices illustrated in FIG. 1 or FIG. 2 or described in connection with the method 300 may be implemented as the system 400. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for differential adaptive bitrate streaming based on scene complexity, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include antenna elements, transceivers, power units, and so forth. Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300, or the entire method 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one example, instructions and data for the present module or process 405 for differential adaptive bitrate streaming based on scene complexity (e.g., a software program comprising computer-executable instructions) can be loaded into memory 404 and executed by hardware processor element 402 to implement the steps, functions, or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for differential adaptive bitrate streaming based on scene complexity (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
    inferring, by a processor, a complexity of a scene contained in a first chunk of an adaptive bitrate streaming video, wherein the first chunk is a next chunk of the adaptive bitrate streaming video to be downloaded to an adaptive bitrate streaming video player, wherein the complexity indicates a relative amount of spatial and temporal information contained in the scene, wherein the complexity of the scene is inferred from a size of the first chunk as measured in data volume;
    selecting, by the processor, a first track from which to download the first chunk, wherein the first track is one of a plurality of tracks containing the first chunk, and wherein each track of the plurality of tracks encoded the first chunk at a different bitrate, and wherein a bitrate of the first track is proportional to the complexity of the scene as inferred, and wherein the size of the first chunk remains consistent across all tracks of the plurality of tracks;
    monitoring, by the processor, one or more conditions of a network over which the adaptive bitrate streaming video is streamed; and
    detecting, by the processor, that the one or more conditions have become unstable,
    wherein the selecting considers sizes of a next several chunks to be downloaded following the first chunk.

2. The method of claim 1, wherein the first track encodes the first chunk at a bitrate that is lower than a highest bitrate that is supported by at least one current condition of a network over which the adaptive bitrate streaming video is streamed, when the complexity of the scene is inferred to be relatively low.

3. The method of claim 1, wherein the first track encodes the first chunk at a bitrate that is at least as high as a highest bitrate that is supported by at least one current condition of a network over which the adaptive bitrate streaming video is streamed, when the complexity of the scene is inferred to be relatively high.

4. The method of claim 1, wherein the next several chunks are selected from tracks of the plurality of tracks in a manner that incrementally reduces bitrates of the next several chunks.

5. The method of claim 1, further comprising:
    determining, by the processor and prior to the selecting, that a scene contained in a second chunk to be downloaded following the first chunk is more complex than the scene contained in the first chunk.

6. The method of claim 5, wherein a bitrate at which the first track encodes the first chunk is lower than a bitrate at which a second track of the plurality of tracks encodes the second chunk.

7. The method of claim 1, wherein the plurality of tracks is defined in a metadata file, and wherein the metadata file specifies, for each track of the plurality of tracks, a bitrate associated with the each track.

8. The method of claim 7, wherein the metadata file further specifies, for each chunk of the adaptive bitrate streaming video including the first chunk, a size of the each chunk.

9. The method of claim 8, wherein the selecting comprises:
    computing, by the processor, an adjustment to a target fill level of a buffer that is to store the first chunk, wherein the adjustment to the target fill level is computed based on an average bitrate of a next m chunks of the adaptive bitrate streaming video to be downloaded from a representative track of the plurality of tracks, a global average bitrate for the representative track, and sizes of the next m chunks.

10. The method of claim 9, wherein the selecting further comprises:
    adjusting, by the processor, an estimated bandwidth of a network over which the adaptive bitrate streaming video is streamed, wherein the adjusting the estimated bandwidth is based on sizes of a next n chunks of the adaptive bitrate streaming video to be downloaded.

11. The method of claim 10, wherein n is greater than m.

12. The method of claim 11, wherein the adjusting comprises inflating the estimated bandwidth when the sizes of the next n chunks are relatively large.

13. The method of claim 11, wherein the adjusting comprises deflating the estimated bandwidth when the sizes of the next n chunks are relatively small.

14. The method of claim 10, wherein the selecting is based on an optimization problem that maximizes utilization of the network over which the adaptive bitrate streaming video is streamed while minimizing a change in a level of quality of the adaptive bitrate streaming video, wherein the level of quality is quantified by bitrate.

15. The method of claim 14, wherein the optimization problem identifies a bitrate for the first track based on an average bitrate of the next n chunks to be downloaded, an average bitrate of the first track, and the estimated network bandwidth as adjusted.

16. A device comprising:
- a processing system including at least one processor; and
- a computer-readable medium storing instructions which, when executed by the processing system, cause the processing system to perform operations, the operations comprising:
  - inferring a complexity of a scene contained in a first chunk of an adaptive bitrate streaming video, wherein the first chunk is a next chunk of the adaptive bitrate streaming video to be downloaded to an adaptive bitrate streaming video player, wherein the complexity indicates a relative amount of spatial and temporal information contained in the scene, wherein the complexity of the scene is inferred from a size of the first chunk as measured in data volume;
  - selecting a first track from which to download the first chunk, wherein the first track is one of a plurality of tracks containing the first chunk, and wherein each track of the plurality of tracks encoded the first chunk at a different bitrate, and wherein a bitrate of the first track is proportional to the complexity of the scene as inferred, and wherein the size of the first chunk remains consistent across all tracks of the plurality of tracks;
  - monitoring one or more conditions of a network over which the adaptive bitrate streaming video is streamed; and
  - detecting that the one or more conditions have become unstable,
  - wherein the selecting considers sizes of a next several chunks to be downloaded following the first chunk.

17. A non-transitory computer-readable medium storing instructions which, when executed by a processing system including at least one processor, cause the processing system to perform operations, the operations comprising:
- inferring a complexity of a scene contained in a first chunk of an adaptive bitrate streaming video, wherein the first chunk is a next chunk of the adaptive bitrate streaming video to be downloaded to an adaptive bitrate streaming video player, wherein the complexity indicates a relative amount of spatial and temporal information contained in the scene, wherein the complexity of the scene is inferred from a size of the first chunk as measured in data volume;
- selecting a first track from which to download the first chunk, wherein the first track is one of a plurality of tracks containing the first chunk, and wherein each track of the plurality of tracks encoded the first chunk at a different bitrate, and wherein a bitrate of the first track is proportional to the complexity of the scene as inferred, and wherein the size of the first chunk remains consistent across all tracks of the plurality of tracks;
- monitoring one or more conditions of a network over which the adaptive bitrate streaming video is streamed; and
- detecting that the one or more conditions have become unstable,
- wherein the selecting considers sizes of a next several chunks to be downloaded following the first chunk.

18. The method of claim 1, wherein the first track further contains a second chunk of the adaptive bitrate video, and wherein a size of the second chunk is different from the size of the first chunk.

19. The non-transitory computer-readable medium of claim 17, wherein the first track encodes the first chunk at a bitrate that is lower than a highest bitrate that is supported by at least one current condition of a network over which the adaptive bitrate streaming video is streamed, when the complexity of the scene is inferred to be relatively low.

20. The non-transitory computer-readable medium of claim 17, wherein the first track encodes the first chunk at a bitrate that is at least as high as a highest bitrate that is supported by at least one current condition of a network over which the adaptive bitrate streaming video is streamed, when the complexity of the scene is inferred to be relatively high.

* * * * *